(12) United States Patent
Dickey

(10) Patent No.: US 8,953,463 B2
(45) Date of Patent: Feb. 10, 2015

(54) CHANNEL INTERLEAVED MULTIPLEXED DATABUS

(75) Inventor: John A. Dickey, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 117 days.

(21) Appl. No.: 13/408,152

(22) Filed: Feb. 29, 2012

(65) Prior Publication Data
US 2013/0223236 A1 Aug. 29, 2013

(51) Int. Cl.
H04L 12/26 (2006.01)

(52) U.S. Cl.
USPC .......................................... 370/249

(58) Field of Classification Search
CPC ............................... H04J 3/00–3/047
USPC ........... 370/67, 84, 85.7, 85.9, 235, 249, 364, 370/535
See application file for complete search history.

(56) References Cited

U.S. PATENT DOCUMENTS

| 2,423,466 | A |   | 7/1947  | Peterson             |
|-----------|---|---|---------|----------------------|
| 3,575,557 | A |   | 4/1971  | Rochester            |
| 3,845,474 | A |   | 10/1974 | Lange et al.         |
| 3,872,256 | A |   | 3/1975  | Schlichte            |
| 5,469,434 | A | * | 11/1995 | Kurdzo et al. ... 370/364 |
| 5,719,874 | A |   | 2/1998  | Heidemann            |
| 5,923,839 | A |   | 7/1999  | Munetoh              |
| 6,036,508 | A |   | 3/2000  | Anderson             |
| 6,151,567 | A |   | 11/2000 | Ames                 |
| 6,772,251 | B1|   | 8/2004  | Hastings             |
| 2002/0129311 | A1 | * | 9/2002 | Ewen et al. ... 714/733 |
| 2007/0027655 | A1 |   | 2/2007 | Schmidt              |
| 2009/0222608 | A1 |   | 9/2009 | Schott               |
| 2011/0090796 | A1 | * | 4/2011 | Bedair et al. ... 370/235 |
| 2011/0131449 | A1 |   | 6/2011 | Hess                 |
| 2011/0156658 | A1 | * | 6/2011 | Schubert ... 320/137 |
| 2012/0201089 | A1 | * | 8/2012 | Barth et al. ... 365/193 |
| 2013/0223199 | A1 | * | 8/2013 | Lund et al. ... 369/53.44 |

FOREIGN PATENT DOCUMENTS

| EP | 0929041 A2 | 7/1999 |
| GB | 2020515 A | 11/1979 |
| WO | 2008029322 A2 | 3/2008 |

OTHER PUBLICATIONS

European Search Report for Application No. 13157175.4-1862, mailed on Apr. 18, 2013. 7 pages.

* cited by examiner

Primary Examiner — Jeffrey M Rutkowski
Assistant Examiner — Peter Mak
(74) Attorney, Agent, or Firm — Cantor Colburn LLP

(57) ABSTRACT

A serial communication system includes a controller, a channel interleaved multiplexed data bus coupled to the controller, and a transceiver coupled to the channel interleaved multiplexed data bus. The channel interleaved multiplexed data bus is arranged as a two dimensional array of time domain interleaved data channels on a backplane of the communication system, the two dimensional array being based on a number of channels available on the backplane and fixed pattern sequence of data transmitted on the backplane.

17 Claims, 8 Drawing Sheets

CHANNEL INTERLEAVED MULTIPLEXED DATABUS

BACKGROUND OF THE INVENTION

The present invention is directed to communications, and more particularly, exemplary embodiments of the present invention are directed to channel interleaved multiplexed databuses on vehicles, and methods of testing the same.

Generally, logic controllers on aircraft communicate with a plurality of Input-Output (I/O) modules over a plurality of communication lines. As the number of necessary I/O modules increases, for example in increasingly complex and large aircraft, the number of required communication lines also increases. It follows that as the number of communication lines increase, an associated weight and complexity of the communication lines also increases. Furthermore, redundancy requirements in some aircraft further increase associated weight and complexity of these communication lines, particularly on associated backplanes.

BRIEF DESCRIPTION OF THE INVENTION

According to an exemplary embodiment of the present invention, a serial communication system includes a controller, a channel interleaved multiplexed data bus coupled to the controller, and a transceiver coupled to the channel interleaved multiplexed data bus. The channel interleaved multiplexed data bus is arranged as a two dimensional array of time domain interleaved data channels on a backplane of the communication system, the two dimensional array being based on a number of channels available on the backplane and fixed pattern sequence of data transmitted on the backplane.

According to another exemplary embodiment of the present invention, a serial communication system includes a controller, a channel interleaved multiplexed data bus coupled to the controller, and a transceiver coupled to the channel interleaved multiplexed data bus. The channel interleaved multiplexed data bus is arranged as a two dimensional array of time domain interleaved data channels on a backplane of the communication system, the two dimensional array having an initial channel reserved as a loopback bit test channel.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

According to exemplary embodiments of the present invention, a solution is provided which significantly reduces the complexity of backplane communication routing and signal counts for serial communications systems within a single vehicle's (or other single-box application) communication arrangement that includes a large number of common style channels, each channel with different control functions using a standardized control/status communications interface to a main controller. This solution allows for smaller interconnects and connectors which are more resilient, robust, and cost effective in environments subject to mechanical vibration. Furthermore, exemplary embodiments of the present invention provide a loopback communication approach which eliminates a need for dedicated channel select lines further simplifying communications systems.

Figure 1:
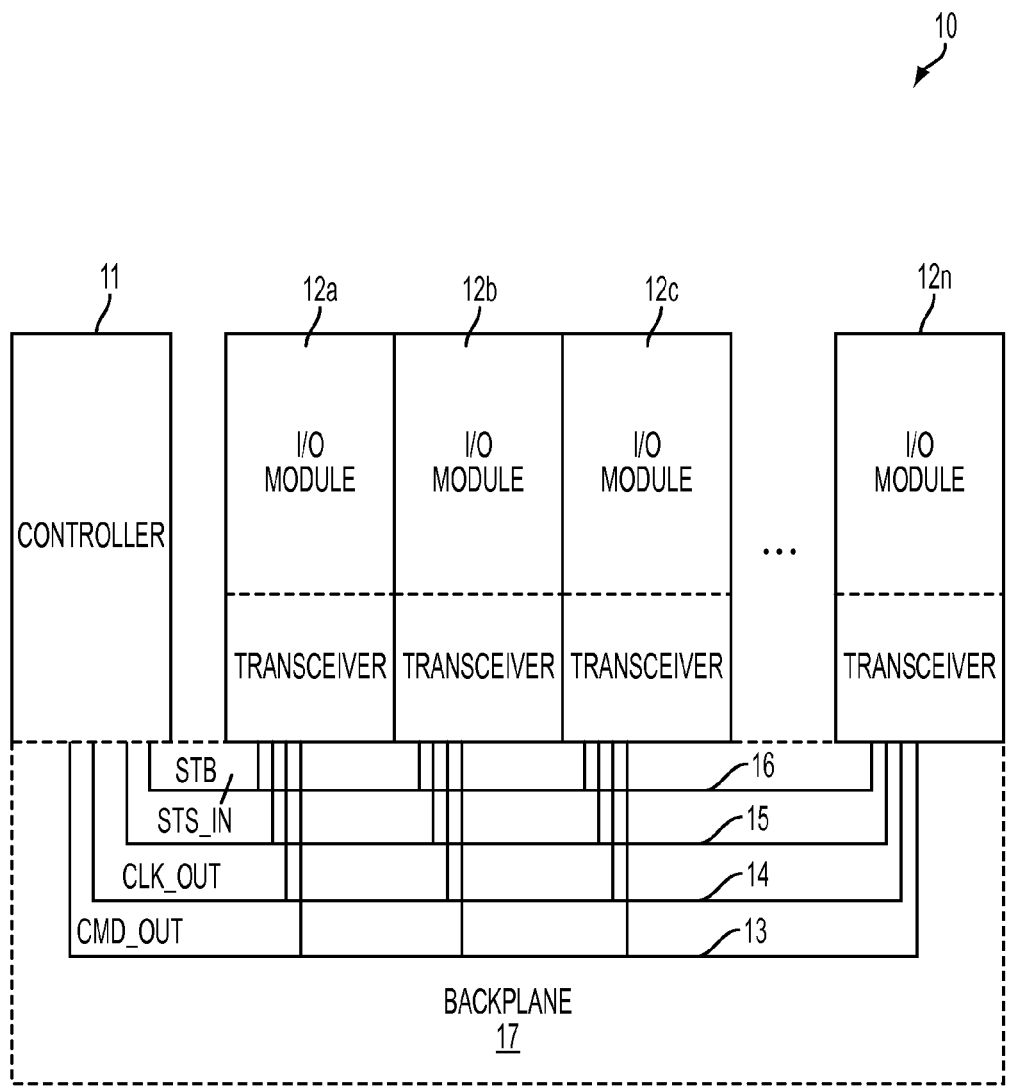
FIG. 1 is a schematic of a portion of a serial communication system, according to an exemplary embodiment of the present invention.

FIG. 1 is a schematic of a portion of a serial communication system, according to an exemplary embodiment of the present invention. As illustrated, the system 10 may include a controller 11, for example, a field programmable gate array (FPGA) or other suitable controller. The controller 10 may provide a plurality of control signals for distribution across backplane 17. The controller 11 may provide a strobe bus STB (bus size determined by maximum number of I/O module slots), an output CMD_OUT, and a clock signal CLK_OUT to a plurality of I/O modules 12a, 12b, 12c and 12n over backplane communication lines 13, 14, and 16. Throughout signal transmission, the controller 11 may receive individual channel status over status communication line 15 (STS_IN). The backplane communication lines 13, 14, 16 are arranged on the single backplane 17, wherein the single backplane further includes physical layer connections for all associated I/O modules and the controller 11.

As illustrated, because communication lines 13 and 14 are time domain interleaved data channels, the resulting backplane communication system is a two dimensional array of time domain interleaved data channels coupled to a plurality of individual transceiver portions of each individual I/O module 12a, 12b, 12c, and 12n. Each transceiver portion of the individual I/O modules receives CMD_OUT which is framed and synchronized according to a common frame rate, initial point, and fixed length. Therefore, even if a plurality of different channels are implemented across each I/O module of system 10, each channel of the plurality of different channels would be transmitting/receiving the same bit number of a fixed length message at the same time. For example, regardless of whether a physical channel or physical module is present, the time slot for the bits of the CMD_OUT and STS_IN for that channel are always reserved at the same time in the overall sequence. As such, each transceiver portion is then able to easily demultiplex associated data based on CLK_OUT, associated dedicated strobe bits from bus STB, and preconfigured settings including fixed length, channel information, and initial point. Upon receipt of associated data demultiplexed from CMD_OUT, the associated data is transferred to an associated channel of each Input Output (I/O) module 12a, 12b, 12c, and 12n.

A first dimension of the two-dimensional array of time domain interleaved data channels is formed from the channels across an individual I/O module (e.g., max number of channels in across any individual I/O module). The second dimension of the two-dimensional array of time domain interleaved data channels is formed of the individual I/O modules (12a-12n) physically stacked onto the backplane 17. For example, the transceiver portions of each I/O module perform the first level of channel interleaving from a module, and the backplane 17 strobe bus STB is used to allow the controller 11 to implement the timing and control of the second level of interleaving (i.e., module to module stepping).

According to at least one exemplary embodiment of the present invention, the output CMD_OUT is a sequential, channel interleaved, fixed pattern, non-return-to-zero output signal, where binary ones and zeros are represented by complementary voltages across fully differential serial communication lines.

Furthermore, according to at least one exemplary embodiment of the present invention, the output CMD_OUT is framed according to a fixed pattern sequence associated with communication lines 13 and 14 such that individual bits are transmitted to each channel of a plurality of channels sequentially according to simple time or bit division multiplexing.

Moreover, according to at least one exemplary embodiment of the present invention, the pattern structure of CMD_OUT is sized to a maximum number of expected channels for a particular serial communication system. Therefore, transmission occurs to all channels regardless of whether a channel is active according to this exemplary embodiment.

Even further, according to at least one exemplary embodiment of the present invention, communication lines 13 and 14 implement fully differential low voltage differential signaling between controller 11 and I/O modules 12a-12n.

Additionally, according to at least one exemplary embodiment of the present invention, a second clock line may be implemented on backplane 17, driven by an individual selected I/O module and synchronized to bit edges of STS_IN, to improve sampling synchronization at relatively high data rates. In this manner, both transmitted and received data are privy to a dedicated, synchronous clock line allowing for better data coherency. For example, in this exemplary embodiment, the controller 11 would still provide CLK_OUT line 14, and each I/O module would send a matched phase "receive" clock, thereby increasing line count to a 4-pair differential rather than the illustrated 3-pair of FIG. 1.

Hereinafter, individual components of the system 10 are described more fully with reference to FIGS. 2-8.

Figure 2:
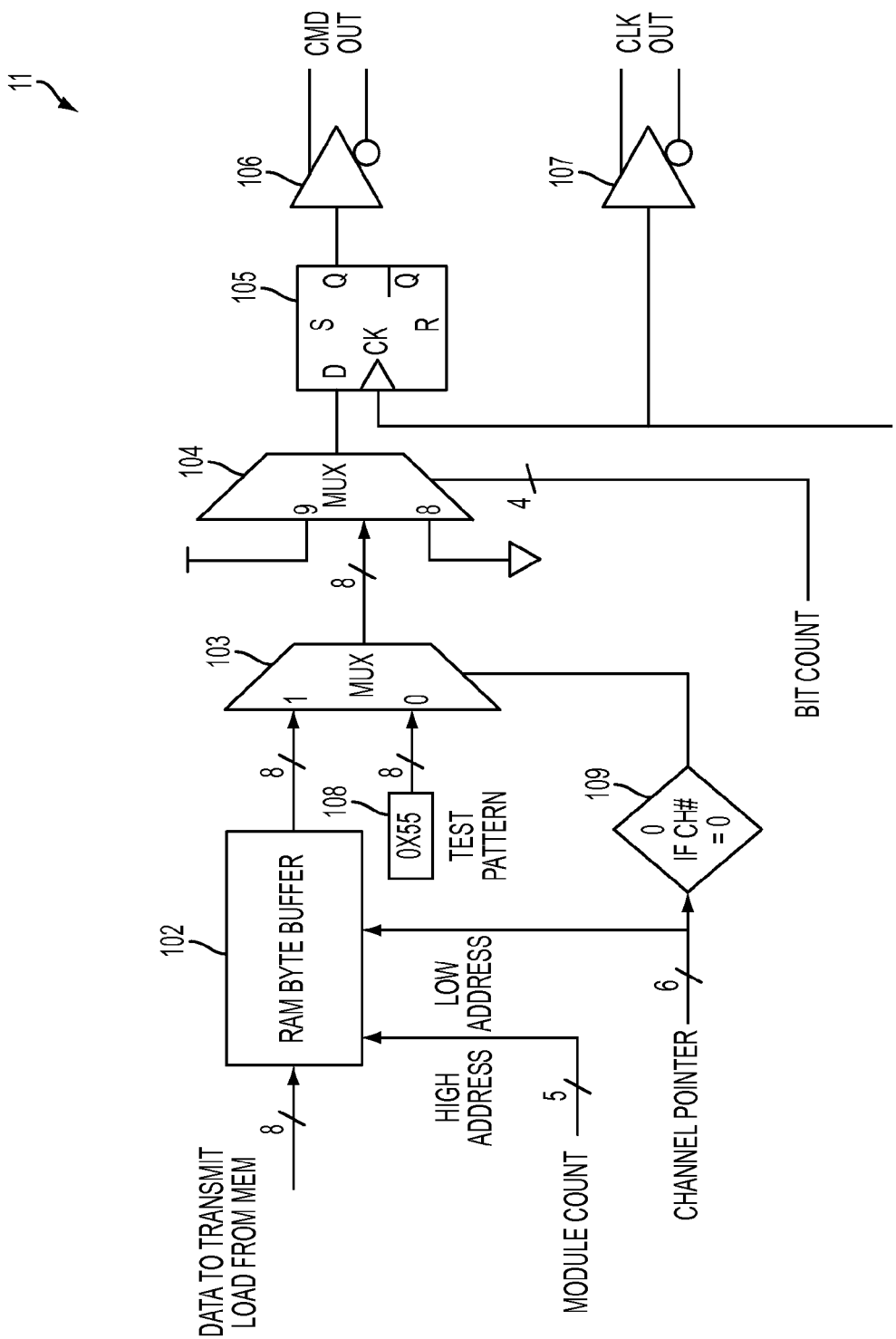
FIG. 2 is a schematic of a portion of a controller for a serial communication system, according to an exemplary embodiment of the present invention.

FIG. 2 is a schematic of a portion of the controller 11 of the system 10, according to an exemplary embodiment of the present invention. As shown, the controller 11 includes byte buffer 102 configured to receive data to transmit from memory. The byte buffer 102 is further configured to receive a total module count and a channel pointer. The total module count may be the maximum expected number of modules for a serial communication system. The channel pointer may be a numerical value representing a current channel being transmitted on.

The controller 11 further includes multiplexer 103 configured to multiplex the data received from buffer 102 and an optional test pattern 108 sequentially based on a current channel pointer modified by test decision block 109. Test decision block 109 modifies the current channel pointer to null to transmit the test pattern 108 based on a fixed cycle. It is noted that although the selected test pattern 108 shown in FIG. 2 is fixed value (i.e., 0x55), this pattern 108 may be selected many ways including the use of a pseudorandom or cyclic-type generator to improve fault detection and isolation levels even further than a fixed value.

The controller 11 further includes second multiplexer 104 configured to multiplex the data received from multiplexer 103 and transmit the same through flip-flop 105, based on a current bit count. As illustrated, the second multiplexer 104 is configured to generate the standard format for non-return-to-zero (NRZ) data with a single start bit, a single stop bit, and no parity, and may be replaced with a wide variety of configurations if byte style NRZ is not a desired protocol. The current bit count is a numerical value representing a currently transmitted bit of a fixed message length message. According to one exemplary embodiment, the fixed message length is eight bytes, thereby allowing simplification of all transceivers to anticipate fixed message lengths of eight bytes, which reduces complexity in a serial communication system. The flip-flop 105 may be clocked by a system clock signal generated at controller 11 (FIG. 1). The clock signal may be buffered and differentiated through buffer/inverter 107 such that fully complimentary signals (e.g., a positive threshold voltage and a negative threshold voltage) are transmitted over signal line 14 (FIG. 1). Similarly, the multiplexed data received from flip-flop 105 may be buffered and differentiated through buffer/inverter 106 such that fully complimentary signals (e.g., a positive threshold voltage and a negative threshold voltage) are transmitted over signal line 13 (FIG. 1). Both the differentiated clock signals and data signals are transmitted to transceivers over a two dimensional array of time domain interleaved data channels as illustrated in FIG. 1.

Figure 3:
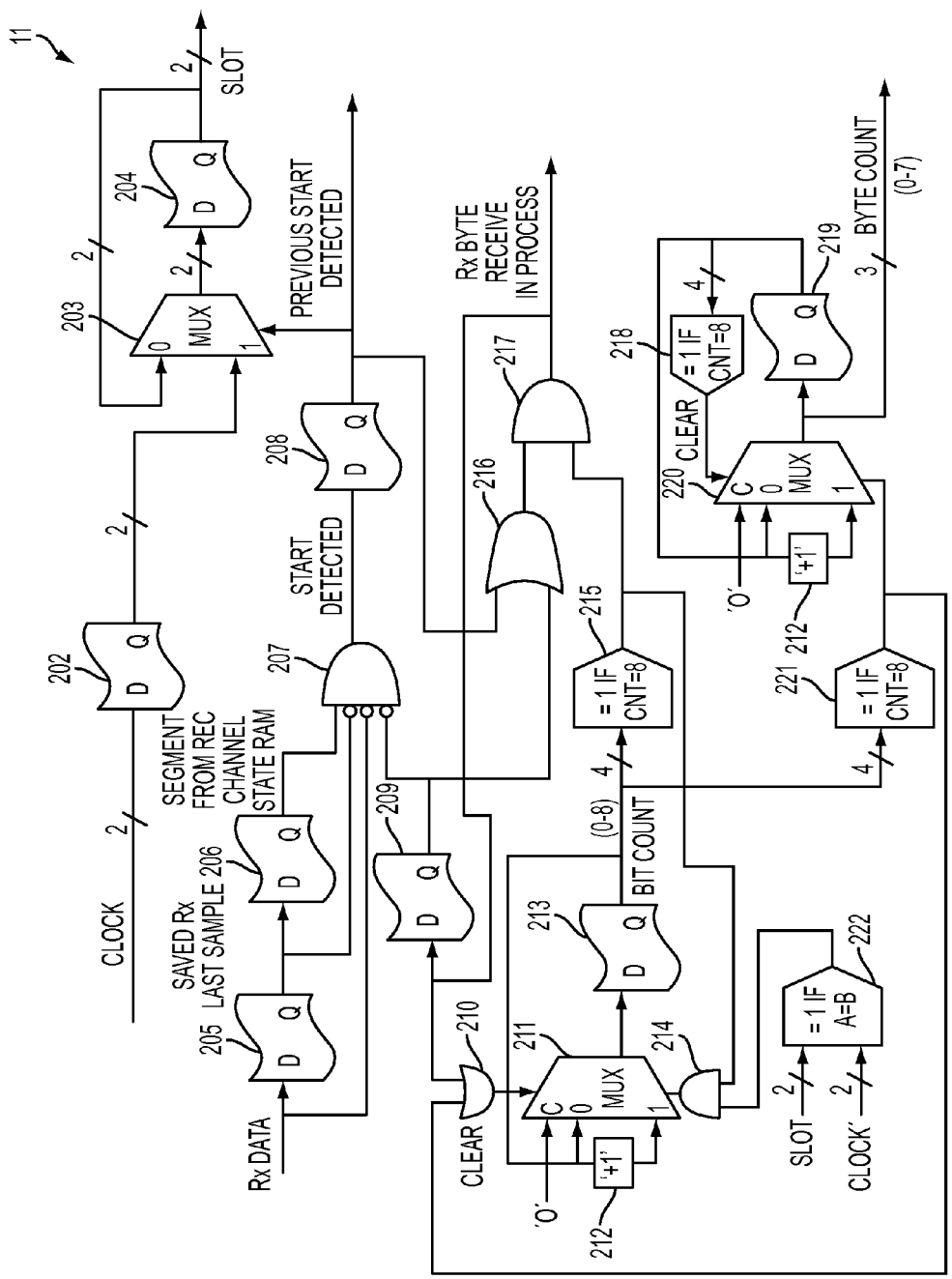
FIG. 3 is a schematic of a second portion of a controller for a serial communication system, according to an exemplary embodiment of the present invention.

Turning now to FIG. 3, a schematic of a second portion of a controller of a serial communication system is illustrated. The controller 11 may receive data to be transmitted at state buffer 205 and an associated clock signal at state buffer 202. The controller may process the same through state buffer 206, 208, and 204, logic gate 207, and multiplexer 203, along with byte in progress information at state buffer 209, to determine a current slot (e.g., I/O module) being transmitted to. Furthermore, the controller 11 may process the current slot information and clock signal at block 222 to update a current bit count. The current bit count may be output from state buffer 213 as a previously stored multiplexed value output from multiplexer 211, which is a value chosen from zero, the previous bit count, and the next bit count 212, selected with an output of logic gate 214. The current bit count value may be reset to the zero value through reset 210. Furthermore, the current bit count may be processed through logic gates 216, 217 and decision block 215 to determine if a byte is currently being received. Similarly, the current bit count may be used to update a current byte count through decision blocks 221, 218 and multiplexer 220. The multiplexer 220 outputs the current byte count as a value chosen from zero, the previous byte count buffered at 219, and the next byte count 212. This information is further processed to de-multiplex received data for each appropriate channel and I/O module, as illustrated in FIG. 4.

Figure 4:
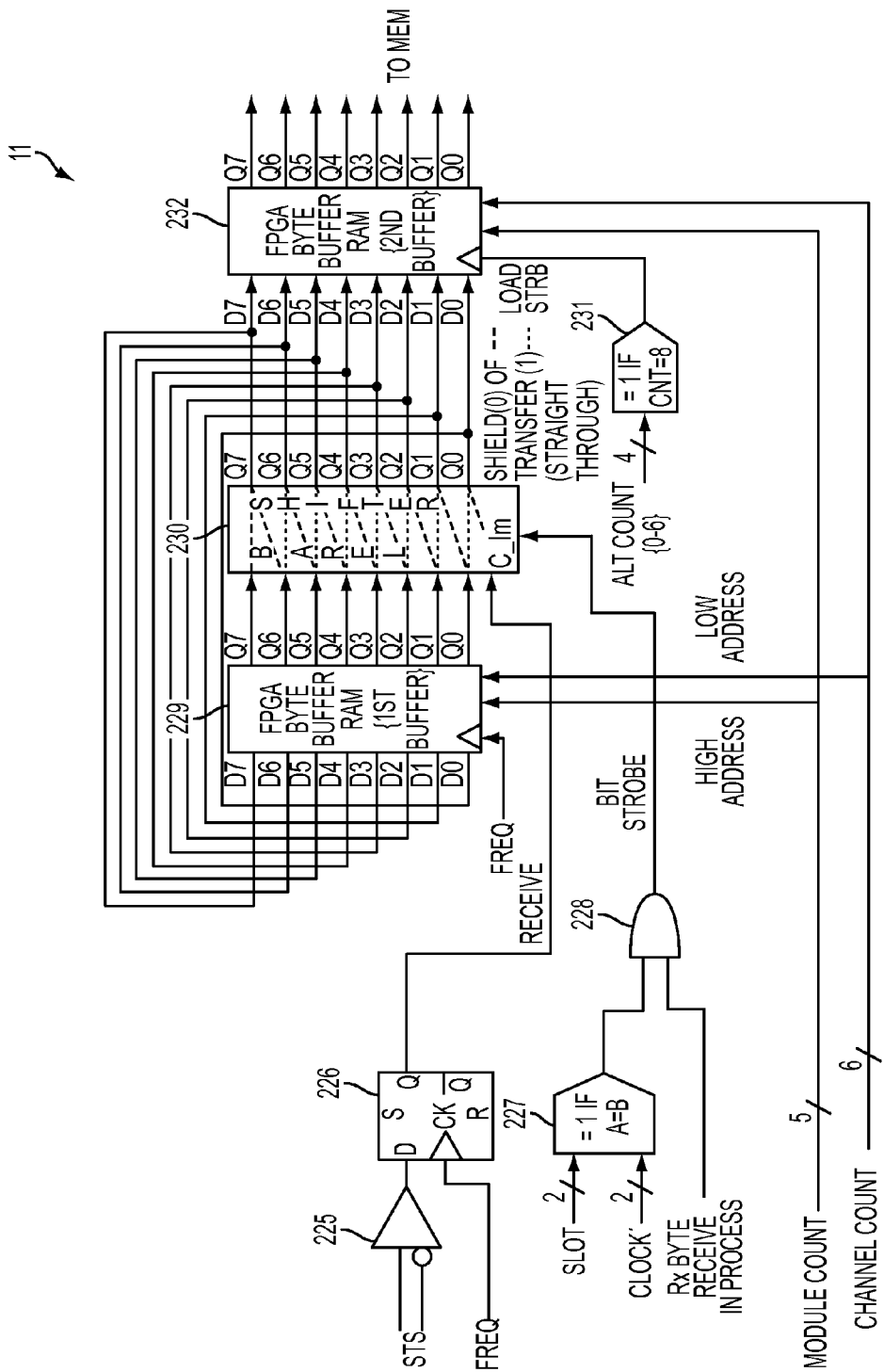
FIG. 4 is a schematic of a third portion of a controller for a serial communication system, according to an exemplary embodiment of the present invention.

FIG. 4 is a schematic of a third portion of controller 11. As illustrated, a differential signal status is received at buffer 225 and clocked into barrel shifter 230 by flip-flop 226. The barrel shifter 230 shifts based on a bit strobe output from gate 228 as a logical AND operation receiving current slot and clock information from decision block 227 and a signal representing whether a byte is currently being received (from FIG. 3). The barrel shifter 230 output is looped back through a first byte buffer 229, and is further buffered and output at a second byte buffer 232 as a full byte of received information if a current bit count 231 represents the last bit of a full byte, which is then stored in memory.

It is noted that the particular arrangement and componentry of FIGS. 3-4 are specifically constructed to support the byte style format protocol for an eight-bit NRZ with a single start bit and a single stop bit. However, these components and associated structure could be replaced with a variety of protocol decoding systems depending on a desired choice of protocol.

It should be appreciated that a plurality of errors may occur during any transmission timeframe, and therefore, it may be beneficial to implement a bit test to ensure correct bit patterns are received at each I/O module of a communication system. According to exemplary embodiments of the present invention, a loopback test bit approach is provided which provides a test channel implemented as a channel bit transmitted with each assembled frame. This channel bit is looped back through a shift register such that each received data bit passes through a series of test logic gates. Upon completion of the loopback for each channel, each received data bit is received on an appropriate portion of an associated channel, thereby ensuring coherent data has been received. Therefore, this loopback scheme assures each message arrives at a specific channel number it is intended for, and similarly that the status received (STS_IN) on the backplane 17 (FIG. 1) is only from the correct channel that corresponds to a particular TDMA bit slot in time. This assures that an automated channel pointer counter that performs the first level of TDMA at a particular I/O module (e.g., transceiver portion function) has not failed and is correctly communicating to each and every channel (e.g., even disabled/absent channels to ensure overall two-dimensional cohesion across all modules) once in the correct sequence.

Hereinafter, a more detailed discussion of the loopback scheme is provided with reference to FIGS. 5-8.

Figure 5:
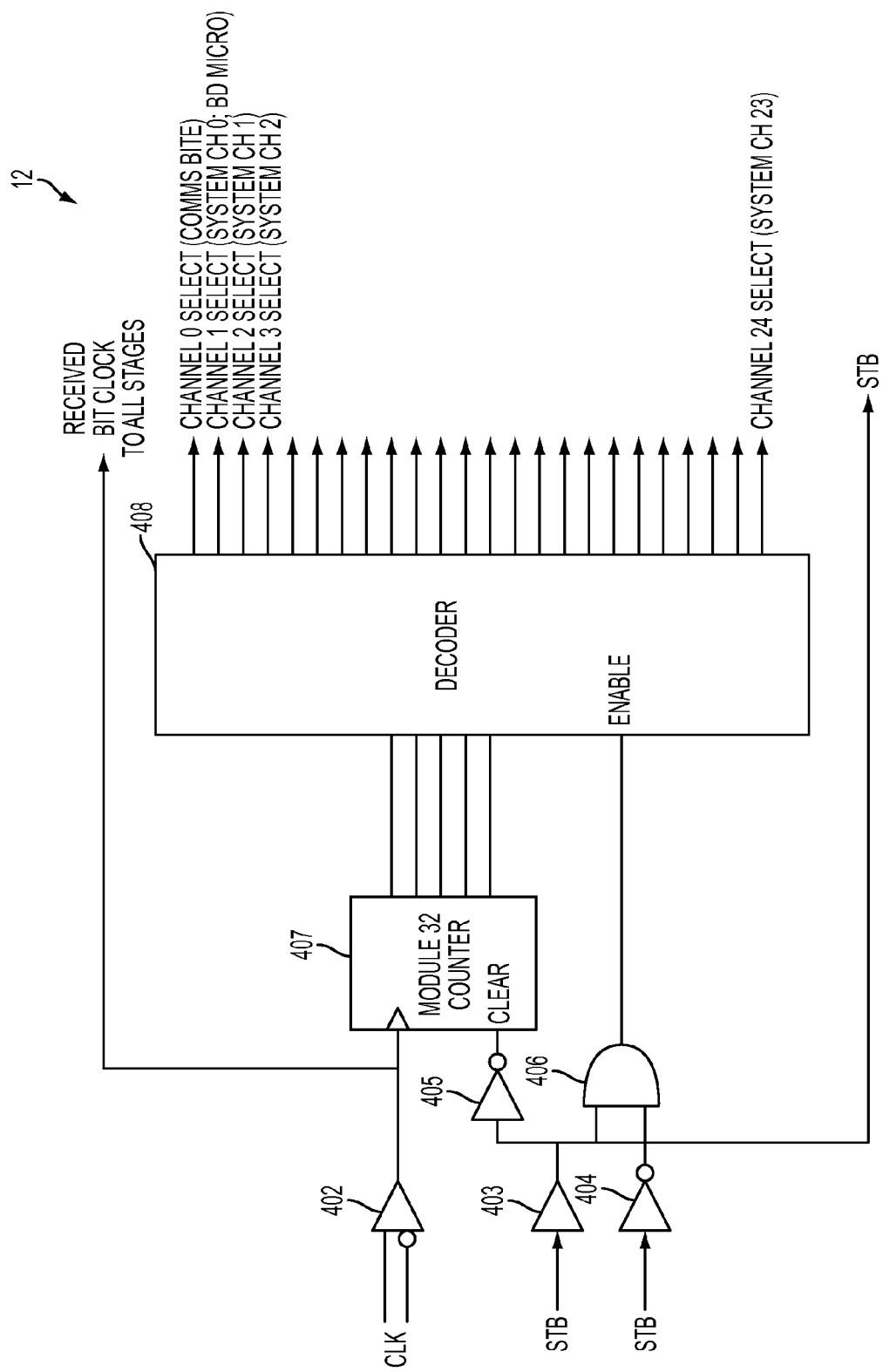
FIG. 5 is a schematic of a channel selector of an individual I/O module of a serial communication system, according to an exemplary embodiment of the present invention.

FIG. 5 a schematic of a channel selector of an individual I/O module 12 (e.g., 12a, 12b, 12c, 12n) of a serial communication system 10, according to an exemplary embodiment of the present invention. As shown, modulo counter 407 presents an encoded channel select signal to decoder 408 such that current channel select information is output. The modulo counter 407 counts up to the appropriate channel using a buffered clock signal 402 (e.g., received across communication line 14), and clears the current channel to zero based on a slot strobe signal processed at logic gates 403 and 405, and phase strobe signal processed at logic gate 404, wherein the strobe signals are configured to strobe at the end of each slot and at each phase change, respectively. The decoder 408 also receives an enable signal from logic gate 406, which also receives signal outputs from gates 403 and 404.

Figure 6:
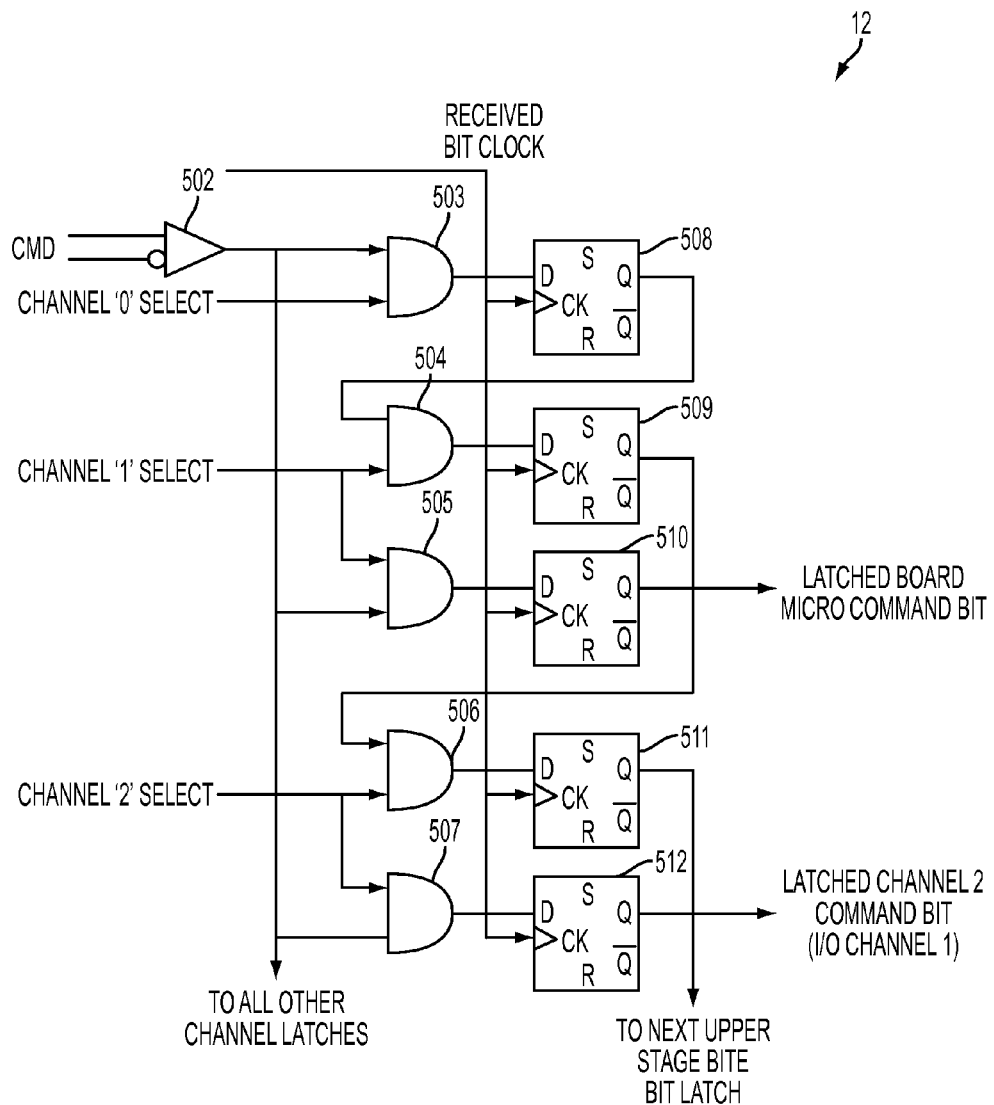
FIG. 6 is a schematic of a portion of a channel latch of an individual I/O module of a serial communication system, according to an exemplary embodiment of the present invention.
Figure 7:
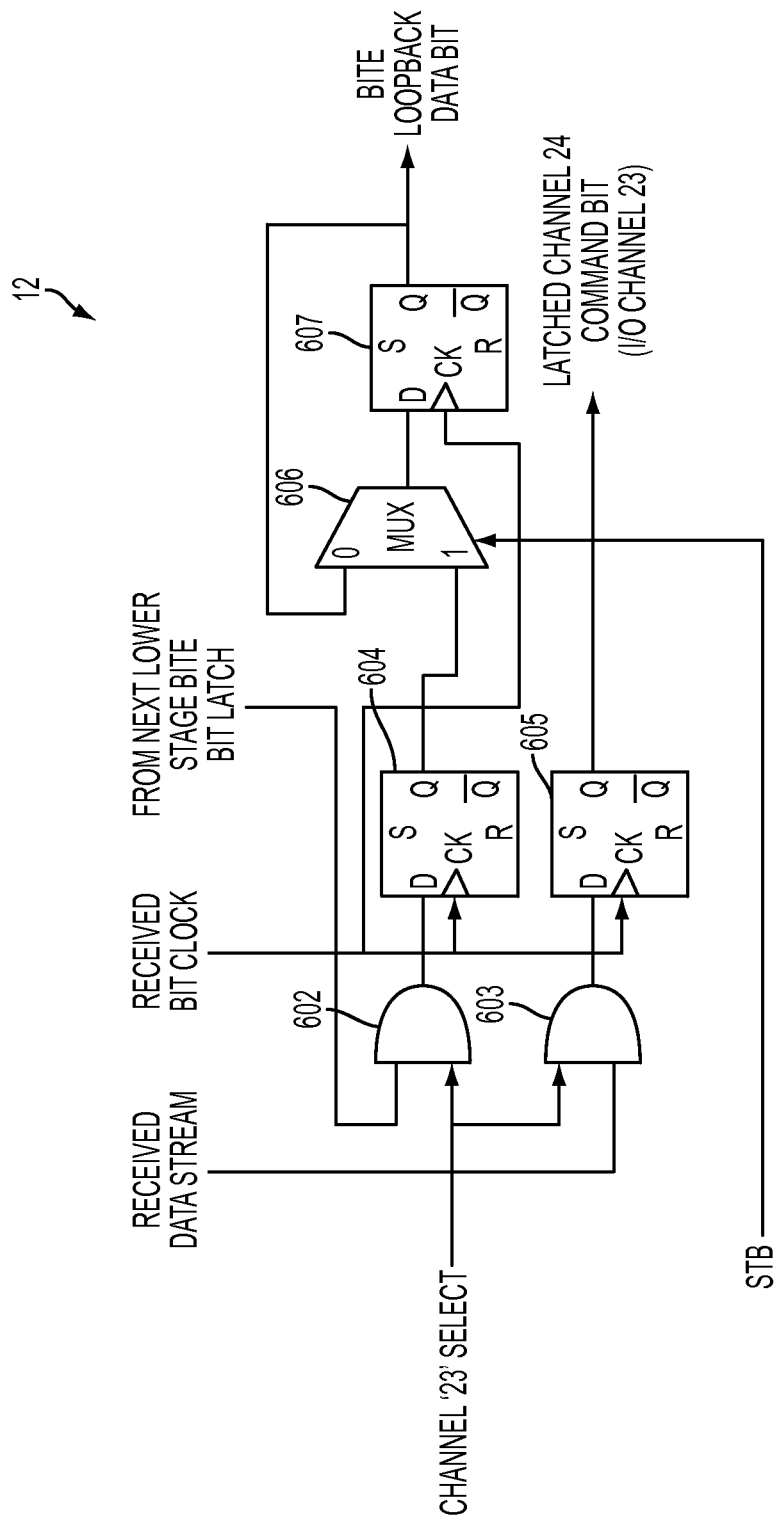
FIG. 7 is a schematic of a loopback portion of a channel latch of an individual I/O module of a serial communication system, according to an exemplary embodiment of the present invention.

Turning now to FIGS. 6-7, a channel latch and loopback portion of an individual I/O module 12 are illustrated. As shown, the received data stream is clocked through a plurality of test logic gates 502, 503, 504, 506, and 602 by flip-flops 508, 509, 511, and 604 to present a loopback test bit to multiplexer 606, which is clocked as a valid test bit at flip-flop 607. Furthermore, each data bit is presented to all channels at logic gates 505, 507, and 603. Upon selection of a bit's appropriate channel with a channel select bit, the bit is latched as a command bit through an associated flip flop 510, 512, and 605. Finally, as all channel data is being received for an appropriate slot, it may be verified through a channel status generation portion of a receiver.

Figure 8:
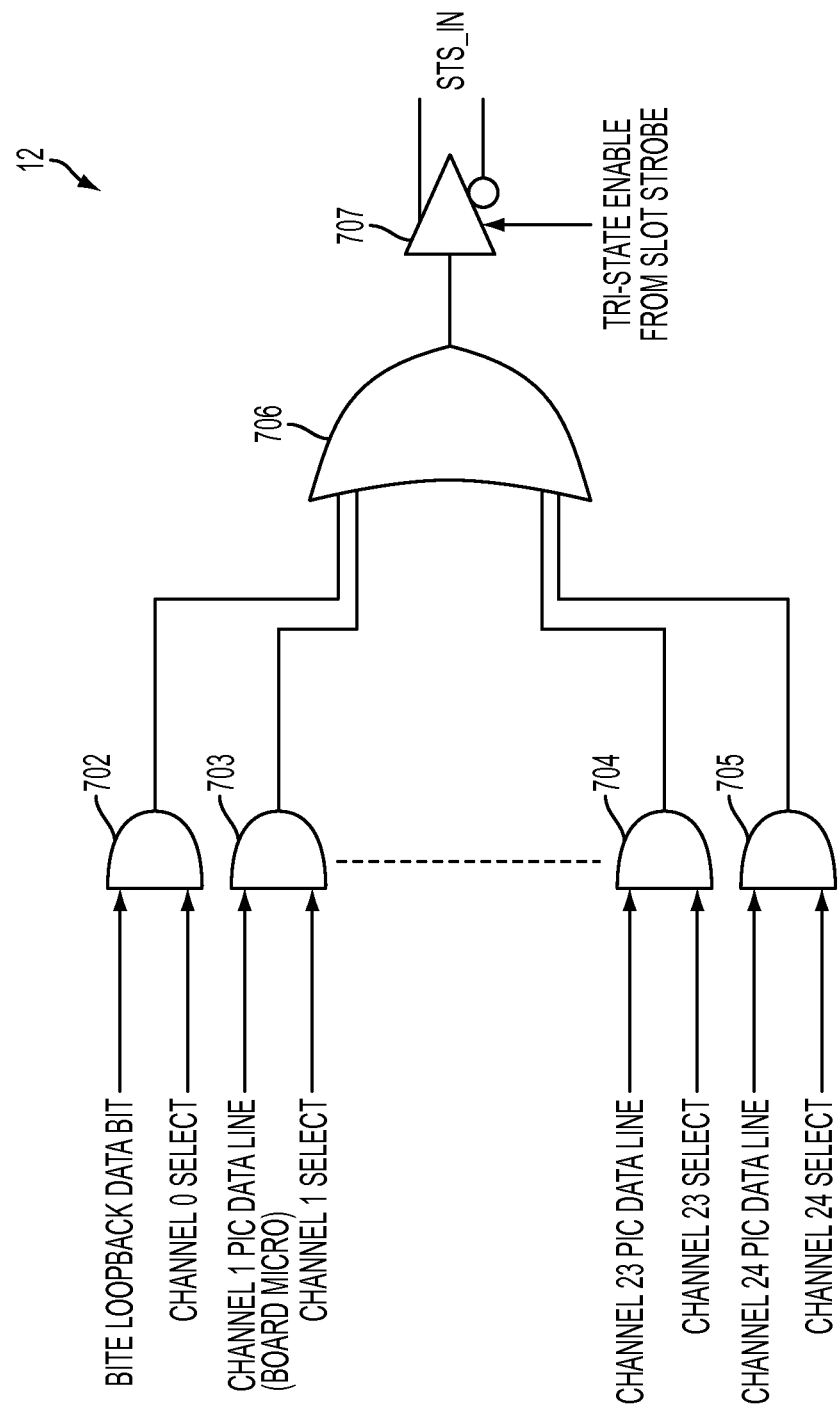
FIG. 8 is a schematic of a channel status generation portion of an individual I/O module of a serial communication system, according to an exemplary embodiment of the present invention.

FIG. 8 is a schematic of a channel status generation portion of an individual I/O module of a serial communication system, according to an exemplary embodiment of the present invention. As shown, a logical OR 706 output is provided as a differentiated status out signal 707. The logical OR is a combination of logical AND operations 702, 703, 704, and 705 of all data line statuses and channel select signals, such that a positive status is presented for each channel successfully received, including the test loopback bit channel. If any data has not been positively received, the data may be retransmitted according to the schemes presented above until positive feedback for each channel is generated at buffer/inverter 707.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while the various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A serial communication system, comprising:
 a controller;
 a channel interleaved multiplexed data bus coupled to the controller, the channel interleaved multiplexed data bus being arranged as a two dimensional array of time domain interleaved data channels on a backplane of the communication system to receive a data signal, the two dimensional array being based on a number of channels available on the backplane and a fixed pattern sequence of data transmitted on the backplane, the two dimensional array having an initial channel reserved as a loopback bit test channel that includes a plurality of test logic gates configured to transmit a test pattern therethrough, the channel interleaved multiplexed data bus also transmitting the data signal through each channel available on the backplane of the communication system based on a channel select signal of a respective channel; and
 a transceiver coupled to the channel interleaved multiplexed data bus,
 wherein the controller being configured to provide a data signal for transmission on the channel interleaved multiplexed data bus and is configured to multiplex the data signal on a sequential channel-by-channel basis, and,
 wherein the data signal is presented to each of the time domain interleaved data channels, and upon completing loopback of the test pattern, performing a verification that each received data bit of the data signal is received at an appropriate portion of a respective time domain interleaved data channel.

2. The system of claim 1, wherein the controller being configured to provide a clock signal for transmission on the channel interleaved multiplexed data bus.

3. The system of claim 1, further comprising:
 a plurality of transceivers coupled to the channel interleaved multiplexed data bus.

4. The system of claim 3, further comprising an input-output (I/O) module coupled to each transceiver of the plurality of transceivers, each I/O module configured to de-multiplex data received from the channel interleaved multiplexed data bus on the sequential channel-by-channel basis.

5. The system of claim 1, wherein the fixed pattern sequence comprises a fixed message length of messages to be transmitted on the data bus.

6. The system of claim 1, wherein the fixed pattern sequence comprises a fully synchronous bit transmission rate.

7. The system of claim 1, wherein the fixed pattern sequence comprises data frames where individual bits are transmitted to each channel of the channels available on the backplane sequentially bit-by-bit.

8. The system of claim 1, wherein the channel interleaved multiplexed data bus is configured as a non-return-to-zero data bus.

9. The system of claim 8, wherein binary ones and zeros transmitted on the non-return-to-zero data bus are represented by complementary voltages across fully differential serial communication lines on the backplane.

10. A serial communication system, comprising:
a controller;
a channel interleaved multiplexed data bus coupled to the controller, the channel interleaved multiplexed data bus being arranged as a two dimensional array of time domain interleaved data channels on a backplane of the communication system to receive a data signal, the two dimensional array having an initial channel reserved as a loopback bit test channel, the loopback bit test channel including a plurality of test logic gates configured to transmit a test pattern therethrough, the channel interleaved multiplexed data bus also transmitting the data signal through each channel available on the backplane of the communication system based on a channel select signal of a respective channel;
a transceiver coupled to the channel interleaved multiplexed data bus,
wherein the controller is configured to provide the data signal for transmission on the channel interleaved multiplexed data bus, and is configured to multiplex the data signal on a sequential channel-by-channel basis, and
wherein the data signal is presented to each of the time domain interleaved data channels, and upon completing loopback of the test pattern, performing a verification that each received data bit of the data signal is received at an appropriate portion of a respective time domain interleaved data channel.

11. The system of claim 10, wherein the two dimensional array is based on a number of channels available on the backplane and a fixed pattern sequence of data transmitted on the backplane.

12. The system of claim 10, wherein the loopback bit test channel further comprises:
a plurality of test logic gates configured to transmit each command bit for each channel of the backplane.

13. The system of claim 10, wherein the controller is configured to provide a clock signal for transmission on the channel interleaved multiplexed data bus.

14. The system of claim 10, further comprising:
a plurality of transceivers coupled to the channel interleaved multiplexed data bus.

15. The system of claim 14, further comprising an input-output (I/O) module coupled to each transceiver of the plurality of transceivers, each I/O module configured to de-multiplex data received from the channel interleaved multiplexed data bus on the sequential channel-by-channel basis.

16. The system of claim 11, wherein the fixed pattern sequence comprises a fixed message length of messages to be transmitted on the data bus.

17. The system of claim 16, wherein the fixed pattern sequence further comprises a fully synchronous bit transmission rate.

* * * * *